V. DEISENHOFER.
SPRING TIRED WHEEL.
APPLICATION FILED MAY 12, 1917.
1,256,526.
Patented Feb. 19, 1918.
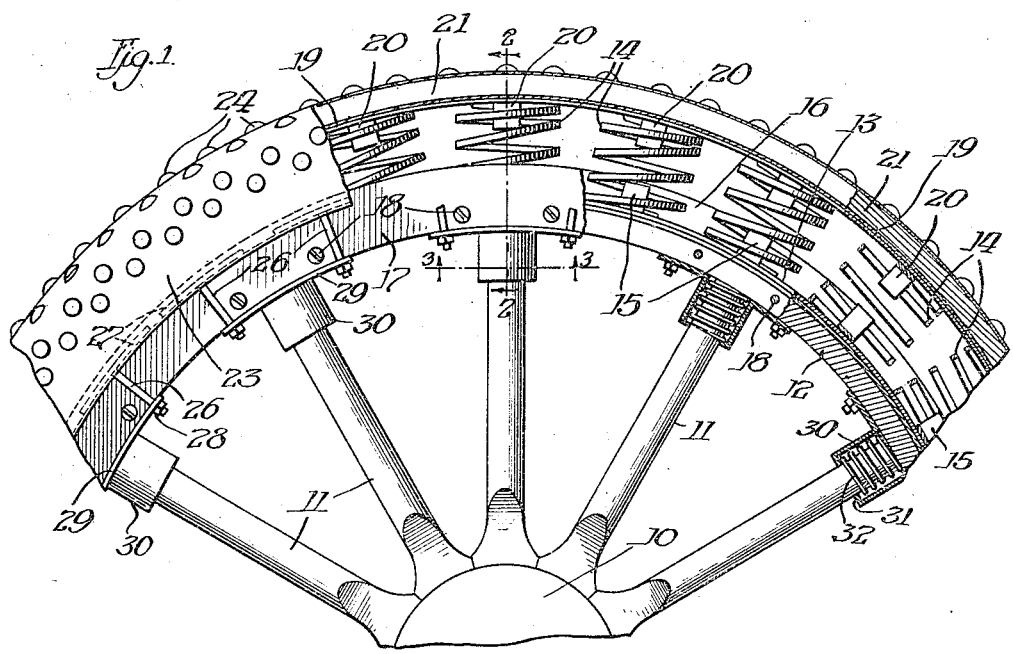
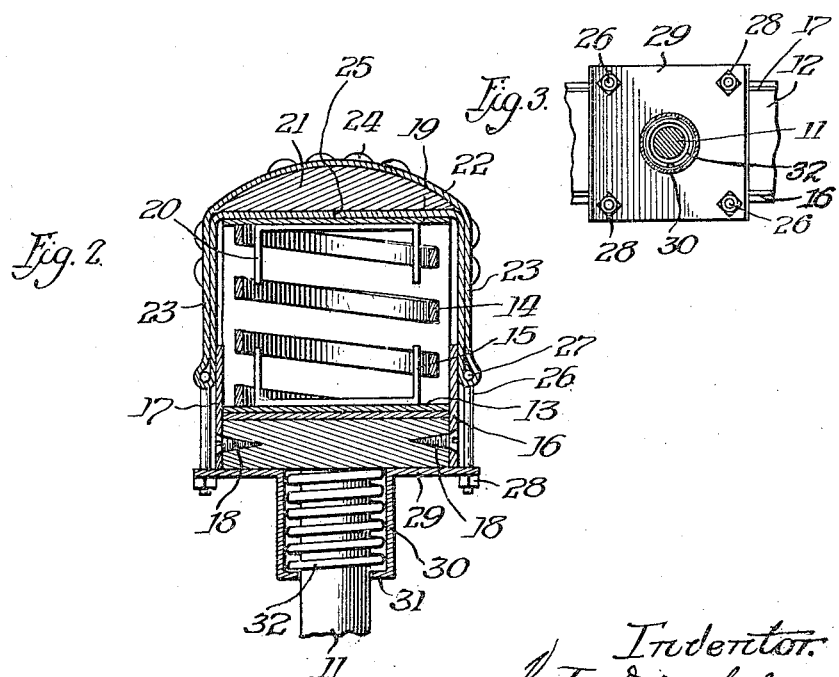
Witness:
Inventor.
Victor Deisenhofer
By Chas. P. Murray, Atty.

UNITED STATES PATENT OFFICE.

VICTOR DEISENHOFER, OF CHICAGO, ILLINOIS.

SPRING-TIRED WHEEL.

1,256,526.

Specification of Letters Patent. Patented Feb. 19, 1918.

Application filed May 12, 1917. Serial No. 168,081.

*To all whom it may concern:*

Be it known that I, VICTOR DEISENHOFER, a subject of the Emperor of Austria, and residing in Chicago, in the county of Cook and State of Illinois, have invented certain new and useful Improvements in Spring-Tired Wheels, of which the following is a specification.

My invention relates to wheels for vehicles and particularly to a novel resilient tire in which springs are employed to secure the resilient action.

An object in the present invention is to provide an extremely simple construction which shall enable the employment of springs and which will enable the utilization of a leather casing or tread portion. I am aware that similar constructions have been suggested but many objections are found therein. One of the objections is in that the casing element is not properly held, or, in other words, is not held in such manner as to take up any slack following the usual deflection incident to service. In my construction the spring elements are positioned between the felly and a continuous spring steel band. Outside of the band a pad or cushion of material such as rubber is placed, this being held by a casing or tread portion of leather, or other suitable material. The side edges of the leather casing are shaped to provide loops with which suitable links or bolts are associated, these bolts engaging a thimble which surrounds a spoke of the wheel and within which a spring is confined acting in opposition to the springs of the tire. The result following the use of such construction is that the casing is always held tightly in position. Other details of construction which will be hereinafter described will also be found novel and advantageous.

The invention will be more readily understood by reference to the accompanying drawings, wherein, Figure 1 is a fragmentary side elevation partly in section, showing a wheel constructed in accordance with my invention;

Fig. 2 is a transverse sectional view somewhat enlarged, on the line 2—2 of Fig. 1; and, Fig. 3 is a sectional view on the line 3—3 of Fig. 1.

In the drawings it will be seen that the wheel is composed of a hub 10, spokes 11, and a felly 12. A continuous band 13, surrounds the felly and acts as a seat for the springs 14. The springs are centered at their inner ends by U-shaped clips 15, secured to the band. The band is held in place by the flat rings 16, 17, which are secured to the felly by screws 18. The outer ends of the springs bear against a flexible steel band or ring 19, having thereon U-shaped clips 20, similar to the clips 15. Outside of the band 19, I place a pad or filler 21, of rubber or similar material. Inclosing the springs is the casing preferably composed of leather. It comprises a tread portion 22 and side portions 23. Metal knobs or studs 24, will preferably be provided in the casing as shown. The leather will be of double thickness, that is, the side edges will be of such length as to enable their being double, the edges terminating at the point 25. Thus the sides are in the form of loops which serve as the means for connecting the T-headed bolts 26 thereto. The heads 27, of the bolts will be round and of considerable length, as shown in Fig. 1, to give a wide bearing area. The lower ends of the bolts, which engage with apertures in the sides of the plate 29 will be threaded to accommodate the nuts 28. A cylinder 30, is formed in the plate, an internal flange 31, at the end of the cylinder providing a seat for a spring 32, which surrounds a spoke 11. The spring bears at its upper end against the felly and normally exerts an expansive force tending to pull the casing downwardly against the force of the springs 14. Normally, of course, the parts will remain in the position shown in Fig. 2, but following a compression of the springs 14, the springs 32, will take up any slack, keeping the casing tight and avoiding flattening of the side members of the leather casing. The bending or creasing of the side edges of tires of this kind which have been heretofore proposed resulted in cracking and ultimate loss of the casing. By guiding the sides of the leather covering on the side flanges 16, 17, a relatively tight joint is made which prevents the entrance of water or dirt and this joint is maintained even under compression of the tire.

It will be noted also that by the provision of the bolts 26 the compression of the springs 14, may be adjusted to suit different loads within certain limits. This function will be found to be of advantage.

Obviously the construction is capable of much modification and such modifications as are within the scope of my claims I consider within the spirit of my invention.

I claim:

1. A wheel, comprising in combination a felly, spokes, a band, springs disposed between the felly and said band, a casing inclosing said springs and band, and radially acting springs carried by the spokes, said last named springs acting on said casing to take up slack when said first mentioned springs are compressed, substantially as described.

2. In a wheel, the combination with a felly and spokes, of side flanges on said felly, springs mounted between said flanges, a continuous band for holding the outer ends of said springs, a leather casing, radially acting spring means for maintaining a constant tension on the sides of said casing, and means for adjusting the compression of said first mentioned springs, substantially as described.

3. In a wheel, the combination of a felly and spokes, springs mounted on the felly, a casing inclosing the springs, fastening devices engaging the side edges of said casing, and springs mounted on the spokes and acting on said fastening devices to maintain a constant tension thereon, substantially as described.

4. In combination, a wheel having a felly and spokes and a channel-shaped rim, springs seated in the channel of the rim, a leather casing, springs carried by the spokes and acting radially in opposition to said first mentioned springs, bearing members normally engaging beneath the felly and acted upon by the springs carried by the spokes, and means connecting said bearing members to the edges of said leather casing, substantially as described.

5. In a spring tired wheel, the combination with the spokes and felly, of a band fitted to the felly and a band spaced therefrom, springs between the bands, spring centering devices carried by the bands, a resilient cushion, a leather casing inclosing said cushion, said casing having inwardly extending sides, and radially acting springs connected to the sides and tending to maintain a constant tension thereon, substantially as described.

6. In a spring tired wheel, the combination of a felly and spokes, springs mounted outside of said felly, a leather casing inclosing said springs, springs carried by the spokes, housings for said last mentioned springs, each of said housings having a portion abutting the inner surface of the felly, and means connecting the housings to the edges of the leather casing, substantially as described.

Signed at Chicago, Illinois, this 8th day of May, 1917.

VICTOR DEISENHOFER.

Witness:
T. D. BUTLER.